UNITED STATES PATENT OFFICE.

WILLIAM GEORGE CLARK, OF HERGOTT SPRINGS, SOUTH AUSTRALIA.

WELDING COMPOUND.

SPECIFICATION forming part of Letters Patent No. 427,969, dated May 13, 1890.

Application filed March 28, 1889. Serial No. 305,173. (No specimens.)

*To all whom it may concern:*

Be it known that I, WILLIAM GEORGE CLARK, machinist, a subject of the Queen of Great Britain, and a resident of Hergott Springs, South Australia, have invented an Improved Process and Material for Coating Iron or Steel with Copper and for Welding Copper and its Alloys, of which the following is a full, clear, and exact description.

My invention relates to the coating of iron or steel with copper, and the welding of copper or alloys of copper—such as Muntz metal—by the application of a special flux. This flux I use in its natural state as obtained from the earth or prepare by the combination of similar component parts. The natural flux is shown on analysis to be composed of 98.3 per centum or thereabout of silicious sand and of soluble matters consisting of oxide of iron, oxide of alumina, and carbonate of lime, the whole being in a very finely-divided state. In making an artificial flux I follow a similar composition as closely as possible without binding myself to the exact relative proportions of the three last-named ingredients.

The method of applying my flux is exceedingly simple. The iron or steel is heated to welding-point, and while at this temperature is covered with the flux, either by dipping it in a chamber containing the same or by dredging the flux upon it from a vessel having a perforated lid. If the iron or steel has been raised to a suitable temperature, the particles of flux adhering thereto will at once melt and flow over the surface of the article under treatment until it has spread entirely over it. The article may then be reheated to a welding temperature and dipped into molten copper. A skin or coating of copper will immediately unite with the iron, from which it cannot be again disunited. In the same way by raising iron or steel to the required temperature and covering it with the flux, sheet-copper of any thickness may be welded thereto by raising it to a similar temperature before application of the welding-surfaces, and by the application of the same flux copper raised to the required temperature can be welded. I wish it to be distinctly understood that I do not bind myself to the exact details of the process or to the exact details of the composition of the flux; but, Having now particularly described and explained the nature of my said invention, and in what manner the same is to be performed, I declare that what I claim is—

In the process of uniting copper with another metal, as described, the application to the heated metal of a flux which consists of silicious sand, oxide of iron, oxide of alumina, and carbonate of lime, in substantially the proportions and for the purpose specified.

In witness whereof I have hereunto signed my name in the presence of two subscribing witnesses.

WILLIAM GEORGE CLARK.

Witnesses:
THOMAS POPE,
FRANCIS HUGH SNOW.